(12) United States Patent
Lang et al.

(10) Patent No.: US 6,445,157 B2
(45) Date of Patent: Sep. 3, 2002

(54) METHOD FOR OPERATING AN ELECTRIC GENERATOR/MOTOR SYSTEM

(75) Inventors: Juergen Lang, Backnang; Conrad Roessel, Syrgenstein, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/790,906

(22) Filed: Feb. 23, 2001

(30) Foreign Application Priority Data

Feb. 23, 2000 (DE) .......................................... 100 08 299

(51) Int. Cl.⁷ ................................................. H02P 7/36
(52) U.S. Cl. ........................ 318/771; 318/767; 318/798
(58) Field of Search ................................ 318/771, 767, 318/778, 798

(56) References Cited

U.S. PATENT DOCUMENTS

| | | | | |
|---|---|---|---|---|
| 4,473,792 A | * | 9/1984 | Nola | 322/47 |
| 4,624,334 A | * | 11/1986 | Kelledes et al. | 180/79.1 |
| 4,965,463 A | * | 10/1990 | Maruyama et al. | 307/87 |
| 5,142,213 A | * | 8/1992 | Stelter | 318/771 |
| 5,598,079 A | * | 1/1997 | Robert | 318/780 |
| 5,653,659 A | * | 8/1997 | Kunibe et al. | 477/111 |
| 6,005,786 A | | 12/1999 | Bluemel et al. | 363/70 |
| 6,054,844 A | * | 4/2000 | Frank | 322/16 |
| 6,275,759 B1 | * | 8/2001 | Nakajima et al. | 701/54 |

FOREIGN PATENT DOCUMENTS

| | | |
|---|---|---|
| DE | 196 10 915 | 9/1997 |
| DE | 197 33 208 | 10/1998 |
| DE | 197 09 135 | 11/1998 |
| JP | 60-261399 | 12/1985 |

* cited by examiner

Primary Examiner—Robert E. Nappi
Assistant Examiner—Rina I. Duda
(74) Attorney, Agent, or Firm—Crowell & Moring LLP

(57) ABSTRACT

A method of operating an electric three-phase machine with a polyphase winding arrangement in a vehicle. The phases of the winding arrangement are connected to a vehicle network with the aid of power converters and the winding arrangements are interconnected in a first method of connection for motor operation and interconnected in a second method of connection for generator operation. Switching over from one method of connection to the other is performed at an instant at which the three-phase machine changes from the state of picking up torque to outputting torque, or from the state of outputting torque to picking up torque.

12 Claims, 1 Drawing Sheet

METHOD FOR OPERATING AN ELECTRIC GENERATOR/MOTOR SYSTEM

BACKGROUND AND SUMMARY OF THE INVENTION

This application claims the priority of German Patent Document 100 08 299.8, filed Feb. 23, 2000, the disclosure of which is expressly incorporated by reference herein.

The invention relates to a method for operating a three-phase machine in a vehicle.

In the case of a concentric drive train generator, an electric machine is installed between the internal combustion engine and the gearbox which can both start the internal combustion engine and ensure the power supply of the vehicle.

However, for a given installation space and given battery power the output torque of the electric machine is frequently insufficient at zero speed to start large-volume spark-ignition engines and, specifically, diesel engines at low temperatures.

Various methods are known for solving this problem. As an example, it has been proposed in the case of an inertia start for a flywheel mass accelerated by the electric machine to be suddenly coupled to the internal combustion engine in order to start the latter moving. This necessitates a clutch with an actuator and controller, which require additional installation space. In the case of a system without a clutch, with large engines there is also a need for conventional starters with drive circuits, which are required only for the case of cold starting.

Two fundamentally opposing requirements are to be fulfilled in the case of electric machines which simultaneously form the starter and the generator for a motor vehicle. Firstly, it is necessary for starting to apply a particularly high breakaway torque which, depending on the displacement and/or number of cylinders and type of the internal combustion engine, for example spark-ignition engine or diesel engine, and depending on the temperatures, can greatly vary. There is also a need, moreover, to apply torque reserves in order to accelerate the internal combustion engine to starting speed.

Secondly, after the internal combustion engine has been started, the electric machine, designed as a starter/generator, is to operate as a generator in order to feed the motor vehicle network. In this case, there is a need for a power output which is as constant as possible over the wide speed range prescribed by the internal combustion engine, usually being 600 to 6000 RPM, in conjunction with an efficiency which is as high as possible.

These two requirements are difficult to satisfy economically with a standard drive, for example comprising a three-phase polyphase machine and a voltage-injecting pulse-controlled inverter in a three-phase bridge connection. If such an electric combination machine is designed for torque, the stator coils contain a relatively large number of turns. The power output of such a machine is, however, already limited at medium speed. Because of the many windings, field weakening operation begins relatively early, and so there is not sufficient control margin available for the pulse-controlled inverter.

If, by contrast, the machine is designed for generator power, the number of turns is correspondingly lower. However, this allows a corresponding rise in the phase currents required to generate the starting torque. A particular problem resides therefore in the overall size of the pulse-controlled inverter, which must permanently exert control over the currents. Furthermore, the battery is subjected to higher loading since high currents are required during starting. In addition, there is a problem with generating sufficient electric power during idling, that is, of displacing the so-called start-up speed or initiation speed of the machine as far as possible into the range of low speeds. This results in a limitation of the power output at higher speeds. Although a corresponding power excess occurs in theory, it cannot be used, because of the fact that the vehicle network voltage is clamped at a fixed value, for example 14 V.

Another method consists in optimizing the operating modes of the electric machine to the effect that at low speeds below the idling speed of the internal combustion engine an operating mode which is optimal for outputting torque is selected, for example a star connection, while for generator operation of the electric machine in the remaining speed band an operating mode is selected which is optimized for efficiency, for example a delta connection. In this case, it is imperative for a traction drive that the operating mode is switched over without a torque jump in simultaneous conjunction with uninterrupted output of torque. Such a method has been proposed in DE 197 33 208 C1 for a generator.

The object of the invention is to specify a method for operating a three-phase machine which permits simplified switchover of operating mode.

In accordance with the invention, switching over from one method of connection to the other is performed at an instant at which the three-phase machine changes from the state of picking up torque to outputting torque, or from the state of outputting torque to picking up torque.

The advantage is to be seen in that changes in the torque/current characteristic have no effect during switchover, since at this instant the torque is equal to zero. In addition, electromechanical switching elements in the system, which are provided to guard against short circuits, are not subjected to loading by high currents during switchover, and can therefore be of simpler and less expensive design.

Other objects, advantages and novel features of the present invention will become apparent from the following detailed description of the invention when considered in conjunction with the accompanying drawings.

BRIEF DESCRIPTION OF THE DRAWINGS

The invention is described in more detail below with the aid of the figures, in which.

DETAILED DESCRIPTION OF THE PREFERRED EMBODIMENTS

Figure 1:
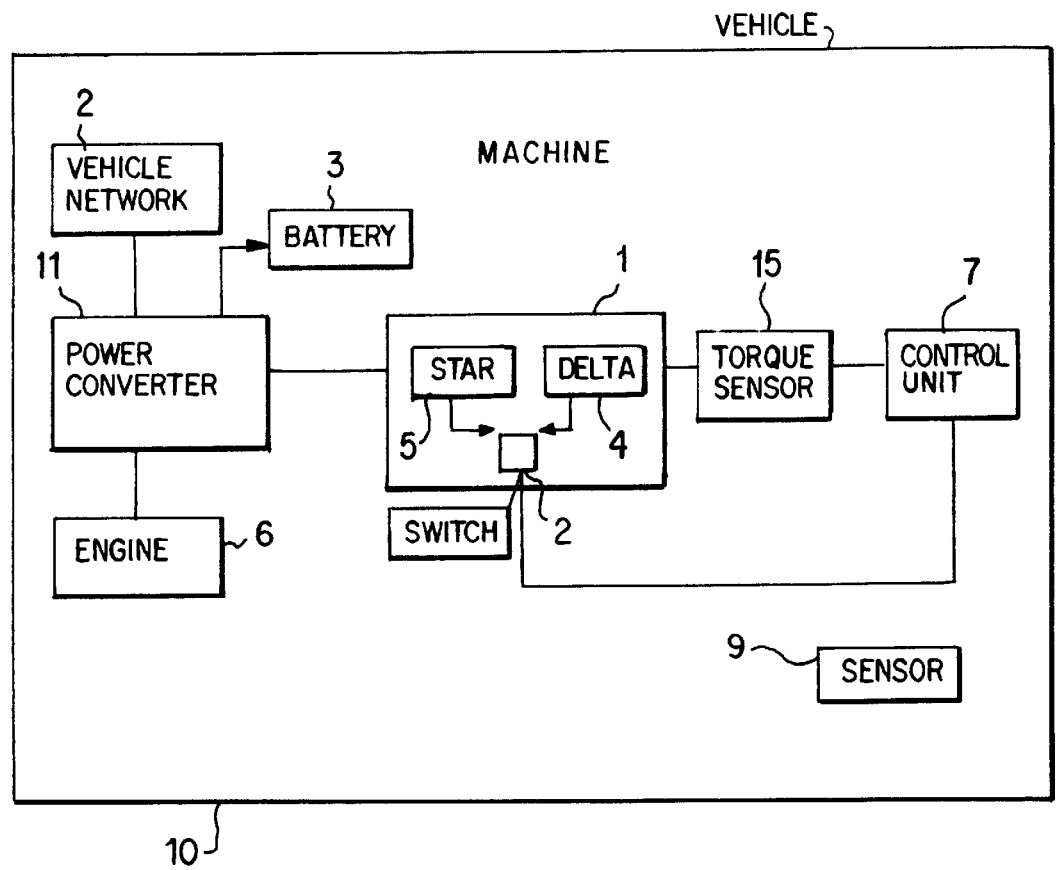
FIG. 1 shows a block diagram of a device for carrying out the method.

A block diagram of an arrangement for operating and driving a three-phase machine used as a drive train generator is illustrated in FIG. 1; the three-phase machine is preferably used as a starter generator. The three-phase machine has a polyphase winding arrangement, with different connection being possible for the winding phases.

A three-phase machine 1 is connected to a switchover switch 2, which can switch the winding phases of the machine 1 into different operating modes. The switchover switch 2 is connected to a battery 3 which can be charged by the three-phase machine in generator operation. The switchover switch 2 has at least two switching positions for two different operating modes of the three-phase machine. In a preferred development, the switchover switch also has at least a third switching position 0 in which the battery 3 can be disconnected electrically from the three-phase machine 1 in the event of a fault. In the block diagram, an internal combustion engine, which can be started by the three-phase machine 1, is not illustrated, nor are control units for controlling the three-phase machine and means for detecting the case of a fault, for example crash sensors 9. Also illustrated is the power converter 11, the vehicle network and a torque sensor as part of the vehicle.

Figure 2:
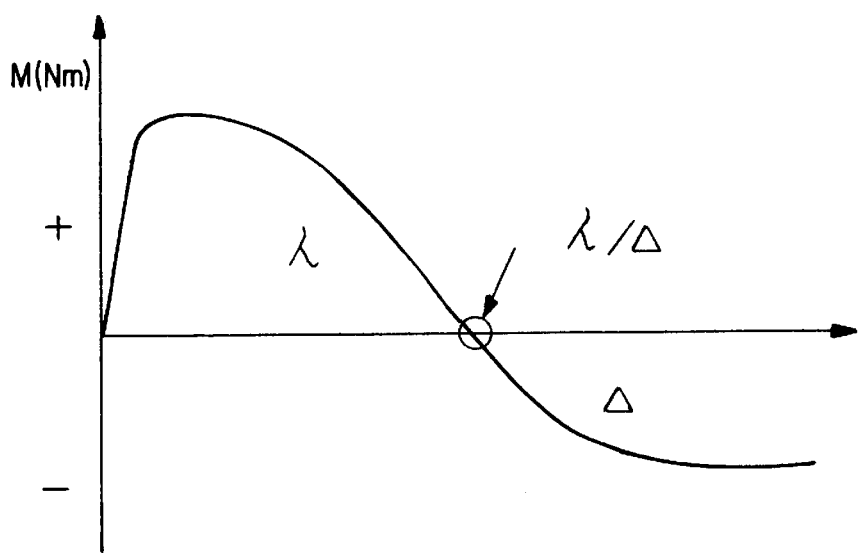
FIG. 2 shows a torque characteristic in the case of which the switchover criterion is illustrated.

The principle of the method according to the invention is illustrated in FIG. 2. Positive torque output occurs in motor operation. Here, for example, an internal combustion engine is started by the three-phase machine. In generator operation, the energy output by the three-phase machine is stored, for example by charging a battery, in particular a storage battery, or some other energy store.

Upon transition from motor operation to generator operation, the operating mode of the three-phase machine is changed at the instant of the zero crossing of the torque characteristic. It is preferable to switchover from a star mode during motor operation to delta mode during generator operation. The star connection constitutes a favorable operating mode for outputting torque, while the delta connection constitutes a favourable level of efficiency for generator operation.

The three-phase machine is preferably controlled by a conventional control unit (not illustrated) by stipulating torque, so that the current torque of the three-phase machine is known at every instant. The instant of switchover is therefore also known precisely. At the switchover instant (torque=0), the control unit outputs an appropriate switching signal to the switchover switch 2. If the case of a fault is detected by sensors which may be present, that is to say a state which is dangerous for the operational reliability of the vehicle such as, for example, in the event of a crash, a short circuit in the system, a case of damage to the machine or control or regulation device, the control unit can likewise send a signal to the switchover switch 2, which then disconnects the battery 3 from the three-phase machine 1. For this purpose, the switchover switch 2 is provided with a third switching position 0 in the case of which a state which is not dangerous for the three-phase machine 1 is switched in and the three-phase machine 1 is decoupled from the battery 3, and from the vehicle network.

However, it is also possible to use torque sensors to detect the instant at which the three-phase machine goes over from outputting torque to picking up torque, or from picking up torque to outputting torque.

The switchover between a first and a second operating mode of the three-phase machine 1, for example between a preferred star connection and a preferred delta connection, is expediently undertaken electronically. However, it is also possible to effect a switchover mechanically. This may be favourable in the case when safety aspects in the event of a fault indicate separation of all the phases of the three-phase machine 1.

With the vehicle parked in the parking position and/or with the internal combustion engine at rest and/or when the vehicle is being started, the three-phase machine is expediently switched into the operating mode favourable for motor operation. When starting the vehicle, it is possible to initiate switchover into the favourable operating mode directly when the vehicle is started or even before it is started, for example when opening of the vehicle is detected and/or the intention to start is detected.

The method according to the invention is a very simple control strategy for using the three-phase machine as a starter generator. The entire starting operation with a simple control strategy for using the three-phase machine as a starter generator. The entire starting operation with a positive torque output can be performed in the operating mode advantageous therefor. Changing over from "starting" to "charging", that is to say during transition to generator operation with negative torque output, is performed at the instant at which no torques are being output or picked up, that is to say at the zero crossing of the torque characteristic. Since the torque is zero, changes in the characteristic have no effect, and switchover is performed smoothly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electric three-phase machine with a polyphase winding arrangement in a vehicle, wherein the phases of the winding arrangement are connected to a vehicle network by power converters, said method comprising the steps of:

interconnecting the winding arrangements in a star method of connection for motor operation of said three-phase machine;

interconnecting said winding arrangements in a delta method of connection for generator operation of said three-phase machine;

measuring a torque output of said electric three-phase machine;

switching from one of said star connection and said delta connection to another one of said star connection and said delta connection when said measured torque is zero during operation of said three-phase machine.

2. The method according to claim 1, wherein said measured torque is a prescribed torque and wherein said torque value is zero during a change from a positive output torque to a negative output torque or from a negative output torque to a positive output torque and wherein said switching occurs by an output signal from a controlled unit to a switchover switch.

3. The method according to claim 1, wherein said change from positive torque to negative torque and from negative torque to positive torque is detected by a sensor which provides an output switching signal to a switchover switch.

4. The method according to claim 1, further comprising the step of switching three-phase machine into start connection during at least one of a parking position of the vehicle and before starting up the three-phase machine.

5. The method according to claim 4, further comprising the step of isolating the three-phase machine at least electrically from one of the vehicle network and the storage battery when the operational reliability of the vehicle is in a state of danger.

6. The method according to claim 1, wherein the three-phase machine is operated as a starter generator.

7. A method for operating an electric three-phase machine with a power phase winding arrangement in a vehicle, the phases of the winding arrangement being connected to a vehicle network with the aide of power converters, the winding arrangements being connected in a first, star method of connection for motor operation and being connected in a second, delta method of connection for generator operation, said method comprising the steps of:

switching over from star to delta connection or from delta to star connection when a torque is zero.

8. The method according to claim 7, comprising the further step of prescribing said torque to the three-phase machine by way of a control unit;

outputting from the control unit a change in signal to a switchover switch when said torque changes from a positive torque to a negative torque or from a negative torque to a positive torque in order to switchover the three-phase machine from one offset star and delta connection to another offset star and delta connection.

9. The method according to claim 8, wherein the change from positive torque to negative torque or from negative torque to positive torque is detected by a sensor and, during the change, a switching signal is output to the switchover switch.

10. The method according to claim 7, wherein the three-phase machine is switched into star connection in the case of a parking position of the vehicle and/or in the case of or before starting up the three-phase machine.

11. The method according to claim 10, wherein the three-phase machine is isolated at least electrically from the vehicle network and/or from a storage battery when the operational reliability is in a state of danger.

12. The method according to claim 7, wherein the three-phase machine is operated as a starter generator.

* * * * *